United States Patent [19]

Yamada et al.

[11] Patent Number: 4,843,832

[45] Date of Patent: Jul. 4, 1989

[54] AIR CONDITIONING SYSTEM FOR BUILDINGS

[76] Inventors: Tetsuo Yamada; Yoshinori Inoue; Sinji Miura; Masao Endo; Tadahiro Fukunaga, all of c/o Takenaka Komuten Co., Ltd. 27, Hon-machi 4-chome; Yashutoshi Yoshida; Setsuo Kaneda, both of c/o Sinko Kogyo Co., Ltd. Nittochi Yodoyabashi Building 1, Okawa-cho, all of Higashi-ku, Osaka-shi, Osaka 541, Japan

[21] Appl. No.: 152,427

[22] Filed: Feb. 4, 1988

[30] Foreign Application Priority Data

| Mar. 12, 1987 | [JP] | Japan | 62-57080 |
| Oct. 20, 1987 | [JP] | Japan | 62-265909 |
| Oct. 31, 1987 | [JP] | Japan | 62-276568 |

[51] Int. Cl.[4] .................. F25B 29/00; F25D 17/02
[52] U.S. Cl. ........................................ 62/159; 62/119; 62/188; 62/434; 62/218; 251/129.01; 236/1 B; 165/26; 165/104.21
[58] Field of Search ............ 62/159, 119, 182, 514, 62/218, 186, 188, 59, 238.6, 434; 165/104.13, 104.21, 26, 911, 913; 236/1 B; 237/2 B; 251/129.01, 129.02, 129.06, 129.15, 129.17

[56] References Cited

U.S. PATENT DOCUMENTS

| 1,572,858 | 2/1926 | Halsey | 62/218 X |
| 1,642,015 | 9/1927 | Cramer | 62/218 |
| 3,378,062 | 4/1968 | Ringquist et al. | 62/159 X |
| 3,461,907 | 8/1969 | Wood, Jr. | 62/188 X |
| 4,270,362 | 6/1981 | Lancia et al. | 62/182 X |
| 4,393,663 | 7/1983 | Grunes et al. | 62/119 |
| 4,406,138 | 9/1983 | Nelson | 62/119 X |
| 4,685,508 | 8/1987 | Iida | 165/28 |

Primary Examiner—Harry B. Tanner

[57] ABSTRACT

An air conditioning system for buildings includes a plurality of air conditioners on the different floors, a cooling gravity type heat pipe connecting vaporizers in the air conditioners with a cold thermal source installed at the top of the building and a warming gravity type heat pipe connecting a condenser of the air conditioners with a hot thermal source installed in the basement of the building. The heat pipes are, respectively, provided with flow control valves at the inlet of each vaporizer and the outlet of each condenser. Each air conditioner is provided with a thermistor for detecting the temperature of the returning air and a liquid level detection switch for detecting the liquid level of the thermal medium in the vaporizer. The flow control valves are respectively controlled based on the detection signals issued by the thermistor and the liquid level detection switch.

5 Claims, 5 Drawing Sheets

AIR CONDITIONING SYSTEM FOR BUILDINGS

BACKGROUND OF THE INVENTION

1. Field of the Invention

The present invention generally relates to an air conditioning system for buildings and more particularly, to an air conditioning system of a type in which thermal energy is conducted through gravity type heat pipes.

2. Description of the Related Art

Generally, in an air conditioning system for a building, water has been used as a thermal medium for facilitating thermal conveyance between the thermal source equipment and the individual air conditioners. Such use of water, however, presented a problem of water leakage from an air conditioner. Recently, therefore, for air conditioning system for buildings, introduction of a volatile substance, such as freon, as a thermal medium to be passed directly between the thermal source equipment and the respective heat exchangers of the air conditioners, is being considered to reduce the problem of liquid leakage by virtue of the volatility of the substance.

The inventors have provided such a type of air conditioning system which utilizes gravity type heat pipes (refer to U.S. patent application No. 113,761). This air conditioning system includes a first thermal storage tank as a cold thermal reservoir which is installed at a high place, such as the roof, in an air-conditioned building; a second thermal storage tank as a hot thermal reservoir which is installed at a low place, such as the basement, in the same building; a plurality of air conditioners each of which is installed in a room to be air-conditioned or at a place close to it such as at floor level, between the first thermal storage tank as a cold thermal reservoir and the second thermal storage tank as a hot thermal source; and gravity type heat pipes which connect the air-conditioner with the first heat storage tank and with the second heat storage thank. The gravity type heat pipes are essentially designed to allow thermal medium to circulate therethrough under a natural pressure generated by a phase change of the thermal medium.

In the air conditioning system as described above the flow of the circulating thermal medium is adjusted to control the warming and cooling conditions in accordance with the required heat load in the respective air-conditioned rooms. It is to be noted, however, there are some problems associated with controlling the flow of the thermal medium. For example, when the air conditioners are installed on the different floors, the water head of the thermal medium in liquid phase is different between the respective air conditioners, resulting in that the degree of heat exchange is not equal in the respective air conditioners. More specifically, since the air conditioner arranged at a lower floor has a higher water head, flow control by a throttle valve or the like is very difficult. When the throttle valve is overly throttled, the thermal medium is not sufficiently supplied to the air conditioner. On the other hand, if the heat pipe vapor through which vapor passes at this air conditioner is filled by liquid thermal medium, a smooth flow of the vaporized thermal medium is hampered so that the heat exchange at the air conditioner can not be effected efficiently, resulting in poor cooling by the air conditioner. In addition, in the state in which a higher water head is caused, the temperature of the thermal medium in a vapor phase is relatively high so that sufficient cooling can not be obtained.

Moreover, when the heat loads at the different air-conditoned rooms are different from each other, the warming and cooling operations at these rooms must be separately adjusted in accordance with the specific heat loads and accordingly, when, for instance, the air conditioning system is operated in the cooling mode, in an air conditioner being subject to a larger heat load, the amount of exchanged heat and accordingly the amount of vapor of the thermal medium become larger so that the resistance in the heat pipe through which the vapor passes becomes larger, that is, since the line or the air conditioners requiring a larger quantity of thermal medium offer larger resistance, a great quantity of thermal medium is disadvantageously supplied to the other line or air conditioners which is not subject to a large heat load and accordingly does not require a large quantity of thermal medium.

SUMMARY OF THE INVENTION

Accordingly, an essential object of the present invention is to provide an air-conditioning system for buildings including a plurality of air conditioners installed, respectively, on the different floors, a gravity type heat pumps for effecting thermal conveyance, and control means for controlling the respective air conditioners on the different floors with high accuracy to condition the temperature of the air in the respective air-conditioned locations as desired.

In accomplishing this and other objects, there is provided an air conditioning system for buildings which comprises:

a cold thermal source which is installed at a high place in the building, a hot thermal source which is installed at a low place in the building, air conditioners which are installed at various levels between said cold and hot thermal sources and each of which has, respectively, a condenser as a heat exchanger for warming air in an air-conditioned area, a vaporizer as a heat exchanger for cooling the air in the air-conditioned area and a fan for blowing air into the air-conditioned area through said condenser and vaporizer, a cooling gravity type heat pipe by which the vaporizers of the air conditioners are connected with the cold thermal source, and in which thermal medium is filled so as to circulate therein, a warming heat pipe gravity type by which the condensers of the air conditioners are connected with the hot thermal source and in which thermal medium is filled so as to circulate therein, temperature sensors for detecting the temperature of the air at the air-conditioned areas, flow control valves which are respectively incorporated in the heat pipes at inlets of the vaporizers and at outlets of the condensers, liquid level detection means for detecting a predetermined level of the thermal medium in a liquid phase in the vaporizer, and controllers which control, respectively, the flow control valves based on detection signals issued by the temperature sensors and the liquid level detection means so that the temperature of air in the air-conditoned locations can be maintained a set valve.

In the above air conditioning system, the warming operation is effected by the passage of the thermal medium the first natural circulation line including the hot thermal source, air conditioners and the passage of thermal medium in the warming heat pipe, while the cooling operation is effected by the second natural circulation line including the cold thermal source, air conditioners and the cooling heat pipe. The flow of the thermal medium supplied to the condensers and vaporizers is controlled by the corresponding flow control valves. The valves are controlled so as to maintain the desired temperature of the returning air returning to the respective air conditioners. For example, when the temperature of the returning air is higher than a predetermined temperature point, the flow control valve associated with the vaporizer is opened or the degree opening thereof is increased, while the other flow control valve associated with the condenser is closed. On the other hand, when the temperature of the returning air is lower than the temperature point, the flow control valve associated with the condenser is opened or opening the degree of thereof is increased, while the other flow control valve associated with the vaporizer is closed. As described above, since the flow control valve, regulating the quantity of the thermal medium to be supplied, are controlled in accordance with the heat load to which the respective air conditioners are subject, the problem in the prior art, in which the required quantity of thermal medium can not be sufficiently supplied to the corresponding air conditioners, while thermal medium in excess of the desired quantity is supplied to the corresponding air conditioners, is obviated. It is to be noted that the flow control valve can be operated by an ON-OFF control of a continuous or step control. Furthermore, the flow control valve associated with the vaporizer is also controlled so that the liquid level of the thermal medium does not exceed a predetermined value. Namely, when the valve is opened and the thermal medium in a liquid phase passes through the valve into the vaporizer and reaches a predetermined level, the liquid level detection means detects this condition and generates a detection signal for closing the valve. Accordingly, the supply of the thermal medium to the vaporizer is controlled based on the difference of temperature between the returning air and the predetermined temperature point and the detection signal from the liquid level detection means.

BRIEF DESCRIPTION OF THE DRAWINGS

This and other objects and features of the present invention will become apparent from the following description taken in conjunction with the preferred embodiment thereof with reference to the accompanying drawings, in which.

DETAILED DESCRIPTION OF THE PREFERRED EMBODIMENT

Figure 1:
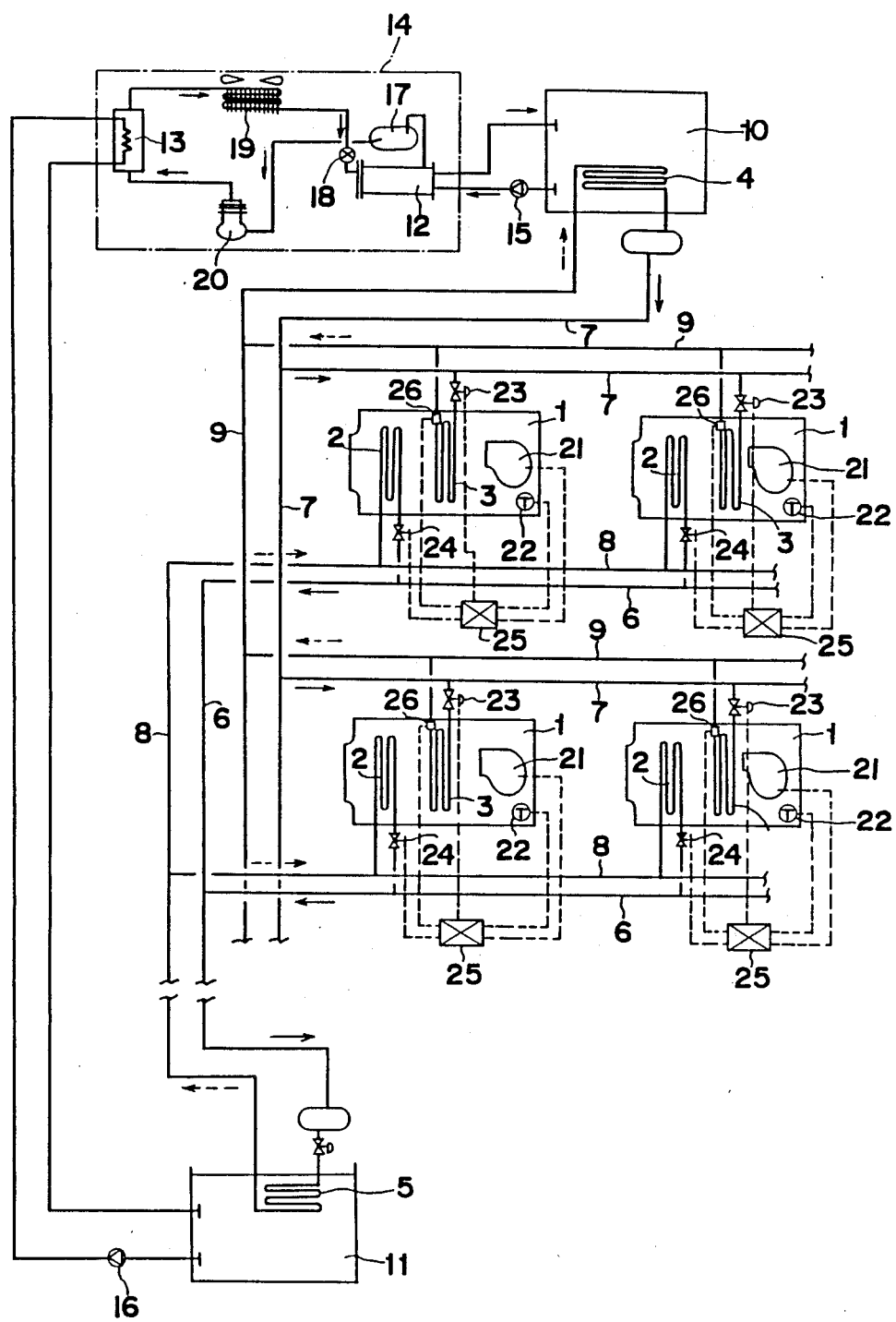
FIG. 1 is a schematic diagram of an air conditioning system for a building according to an embodiment of the present invention.

Before the description of the present invention proceeds, it is to be noted that like parts are designated by like reference numerals and symbols throughout the several views of the accompanying drawings.

Referring now to the drawings, there is shown in FIG. 1 an air conditioning system for a building, in schematic form, according to the present invention. The installations in this system are positioned according to a specification with respect to height. The air conditioners 1 are installed at air-conditioned rooms on different floors of the building. The air conditioner 1 includes a first condenser 2 as a heat exchanger for warming the air in the air-conditioned room and a first vaporizer 3 as a heat exchanger for cooling the air in the air-conditioned room. A second vaporizer 5, defining a thermal medium circulation line with the first condenser 2, is installed at a location that is disposed lower than any of the locations at which the air conditoners 1 are installed. A second condenser 4, defining a thermal medium circulation line with the first vaporizer 3, is installed at a location that is disposed higher than any of the locations at which the air conditioners 1 are installed. In each thermal medium circulation line, the vaporizer and condenser are connected to each other through corresponding heat pipes 6, 8 and 7, 9. The second condenser 4 is incorporated in a cold thermal source, such as an ice type thermal reservoir 10, which is installed at a high place, such as a roof, whereas the second vaporizer 5 is incorporated in a hot thermal source, such as a hot water type thermal reservoir 11, which is installed at a lower place, such as a basement of a building. The thermal source device that provides the thermal reservoirs 10 and 11 with cold energy or hot energy is a heat pump chiller 14 with an ice-making device 12 and hot water making device 13. A slurry pump 15 is provided between the ice type thermal reservoir 10 and the ice making device 12 to force ice made by the ice-making device 12 into the ice type thermal reservoir 10. A hot water heat recovery pump 16 is provided between the hot water type thermal reservoir 11 and the hot water making device 13 to force hot water into the thermal reservoir 11. In the drawings, 17 denotes an accumulator, 18 an expansion valve, 19 an air-heat exchanger and 20 a compressor.

The air conditioner 1 essentially, includes, other than the above-described first condenser 2 and first vaporizer 3, a fan 21 and a thermistor 22 for detecting the temperature of the air returning from the air-conditoned room by being sucked by the fan 21. Flow control valves 23 and 24 are incorporated in the inlet of the first vaporizer 3 and the outlet of the first condenser 2. A liquid level detector 26 is mounted on a upper portion of the first vaporizer 3. The detection signals from the thermistor 22 and the liquid level detector 26 is issued to a controller 25. The controller 25 carries out a calculation based on the signals to determine the suitable opening of the flow control valves 23 and 24 and the suitable revolution of the fan 21, and generates corresponding command signals which are output to the flow control valves 23 and 24 and the fan 21.

Figure 2:
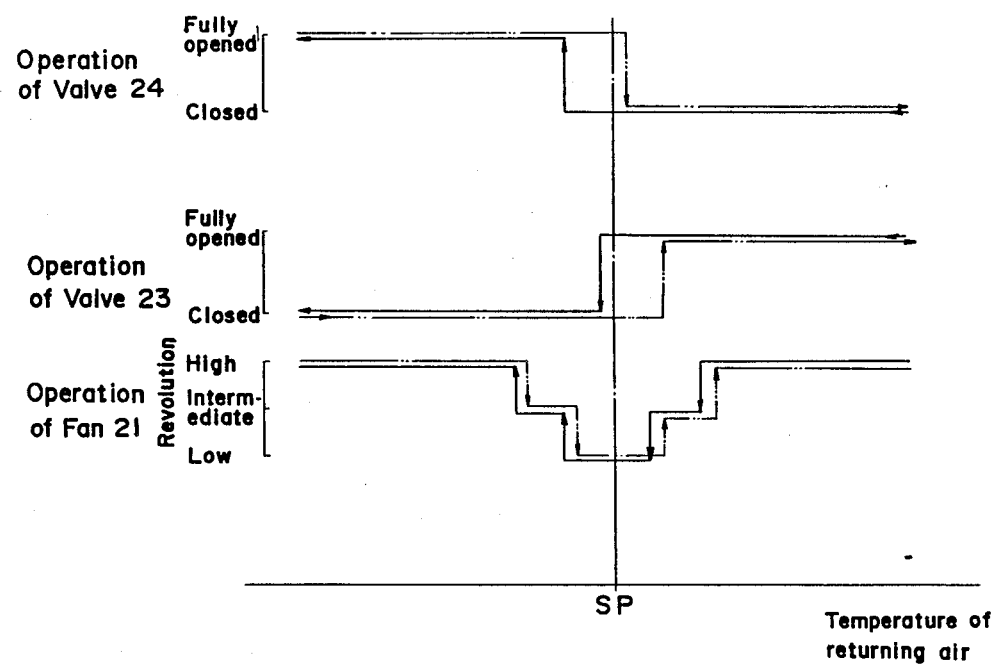
FIG. 2 is a diagram illustrating the operation of the flow control valves and the fan with respect to the temperature of the air returning to the air conditoners, in the embodiment of FIG. 1.

FIG. 2 diagrammatically illustrates the a control of the opening of the valves 24 and 23 corresponding to the first condenser 2 and the first vaporizer 3 and revolution of the fan 21 with respect to the temperature of the air returning from the air-conditoned room. In FIG. 2 the operation of the valve 24 associated with the first condenser 2 is illustrated at the uppermost portion, the operation of the valve 23 associated with the first vaporizer 3 is illustrated at the middle portion, and the operation of the fan 21 is illustrated at the lowermost portion. In this embodiment, the desired value of the temperature in the air-conditioned room is predetermined temperature at a set point SP. When the temperature of the returning air has become lower than the set point SP, a warming operation is started, while when the temperature of the returning air has risen above the set point SP, a cooling operation is started.

In this embodiment, the flow control valves 23 and 24 respectively consist of ON-OFF type valves. When the temperature of the returning air is above the set point SP, the valve 24 associated with the first condenser 2 is closed and the valve 23 associated with the first vaporizer 3 is opened thereby switching to the cooling operation. On the contrary, when the temperature of the returning air is below the set point SP, the valve 24 is opened and valve 23 is closed thereby switching to the warming operation. That is, the cooling and warming operations are alternatively switched around the set point SP. In this switching operation, the difference between the temperature at which the respective valve 23 or 24 is opened and the point SP is larger than the difference between the temperature at which the respective valve 23 or 24 is closed and the set point SP. Namely, when the the cooling operation is switched to the warming operation as shown by the solid line in FIG. 2, the valve 23 is closed at a temperature slightly below SP and subsequently the valve 24 is opened at a temperature further below SP. On the contrary, when the warming operation is switched to the cooling operation as shown by the two-dot chain line in FIG. 2 the valve 24 is closed at a point slightly above the set temperature SP and subsequently the valve 23 is opened at a temperature further above SP. It is to be noted, here, that even if the temperature of the returning air is not sufficiently lowered to stop the cooling operation, when the thermal medium sufficiently occupies the first vaporizer 3, the liquid level detector 26 generates a detection signal to close the valve 23.

The fan 21 is controlled so as to rotate at three speeds, i.e. high, intermediate and low speeds. The more remote from point SP, the temperature of the returning air is, in both cooling and warming operations, the faster the fan 21 rotates. The solid line illustrates the switching of the operation cooling to the warming operation, while the two-dot chain line illustrates the switching of the warming operation to the cooling operation. The temperatures at which the revolution of the fan is switched from a higher speed to a lower speed are closer SP than the temperatures at which the revolution of the fan is switched from a lower speed to a higher speed. In addition, the fan 21 is controlled so that when the valve 24 associated with the first condenser 2 and the valve 23 associated with the first vaporizer 3 are respectively opened, the revolution of the fan 21 is at, substantially the same time, switched from low speed to intermediate speed.

Figure 3:
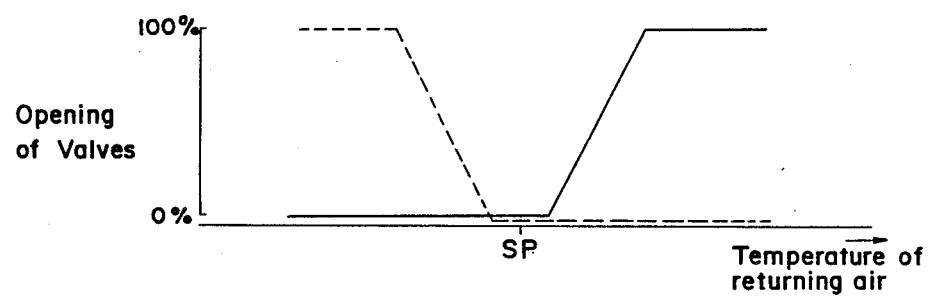
FIG. 3 is a diagram illustrating the operation of the first vaporizer and first condenser with respect to the temperature of the returning air.

Alternatively, as shown in FIG. 3, it is possible that the revolution of the fan 21 be maintained constant; and, only the valves 23 and 24 are controlled so as to open proportionally in accordance with the divergence of the temperature of the returning air with respect to SP. It is to be noted that in FIG. 3, the solid line illustrates the operation of the valve 23, while the broken line illustrates the operation of the valve 24.

Figure 4:
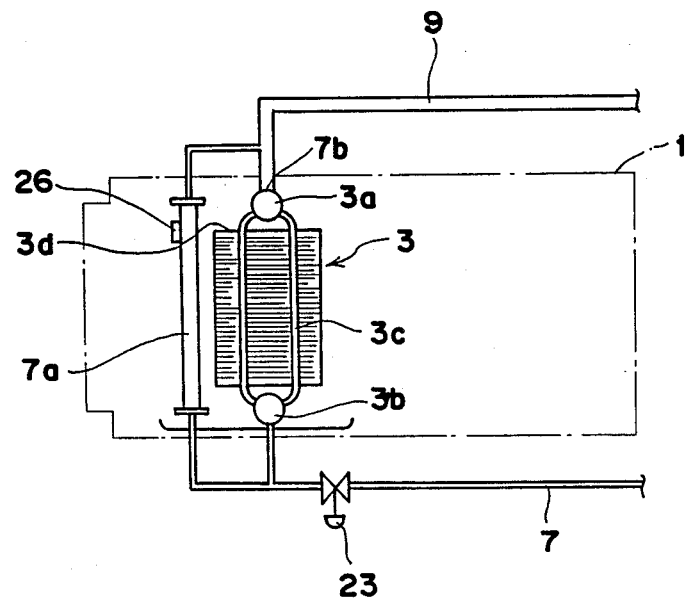
FIG. 4 is an enlarged view showing an essential part of the air conditoner.

FIG. 4 is an enlarged view of the air conditioner 1 showing the configuration of the first vaporizer 3 and the liquid level detection means in detail, the first condenser, fan and thermistor being omitted. The first vaporizer 3 comprises a lower header 3b which is connected with the heat pipe 7 through which thermal medium in a liquid phase passes, the flow control valve 23 being incorporated in the heat pipe at a location adjacent to the lower header 3b, a coil 3c connected with the lower header 3b and constituting the essential portion of heat exchanger, and an upper header 3a which is connected with both the coil 3c and the heat pipe 9 through which thermal medium in a vapor phase passes. The liquid level detection means comprises a bypass 7a which is connected with both the heat pipes 7 and 9, and a liquid level detection switch 26 which is mounted on the bypass 7a at a predetermined location to detect the liquid level of thermal medium in the bypass 7a and accordingly in the coil 3c. When the switch 26 detects that the thermal medium in liquid phase has reached a predetermined level, the switch 26 generates a detection signal and issues it to the controller 25 to close the valve 23.

The flow control valve 23 consists of, in one embodiment, an electromagnetic valve which is controllable by the switch 26 which in turn is mounted on the bypass 7a at such a level that it detects when thermal medium in a liquid phase flows past the uppermost fin 3d. It is to be noted here, that in order to facilitate effective cooling, it is important that the coil 3c be filled by the thermal medium in a liquid phase up to a level corresponding to the uppermost fin. Furthermore, it is also important that the inlets 7b of the heat pipe 9, which are open to the interior of the upper header 3a, not be occupied by the thermal medium in a liquid phase, in other words, at least the upper portion of the header 3a should be occupied by vapor. If the inlets 7b are occupied by the thermal medium in a liquid phase, the thermal medium which has been vaporized in the coil 3c, and the upper header 3a, can not flow quickly into the heat pipe 9.

The valve 23 is closed when the air conditioner 1 is not operated. The valve 23 is also closed when the temperature detected by the thermistor 22 is below SP even if the liquid level of the thermal medium is below the predetermined level which is detected by the switch 26.

Figure 5:
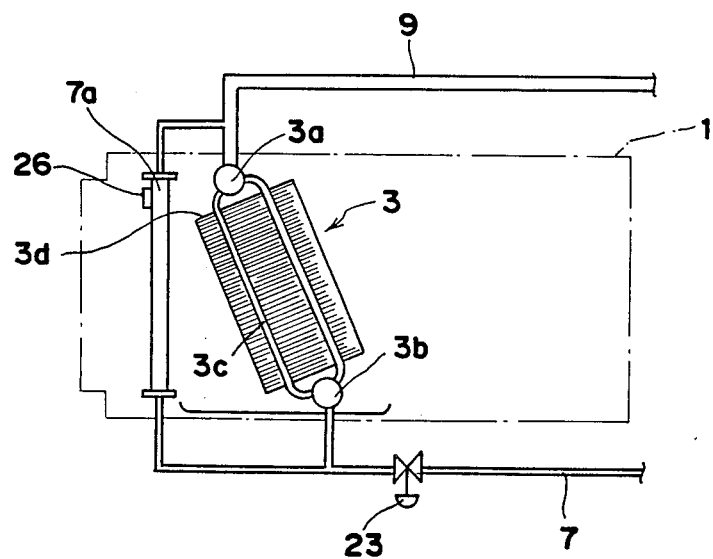
FIG. 5 is an enlarged view showing a modification of the air conditioner shown in FIG. 4.

Alternatively, the first vaporizer 3 may be mounted in the housing of the air conditioner 1 so as to extend in an inclined plane, shown in FIG. 5.

Figure 6:
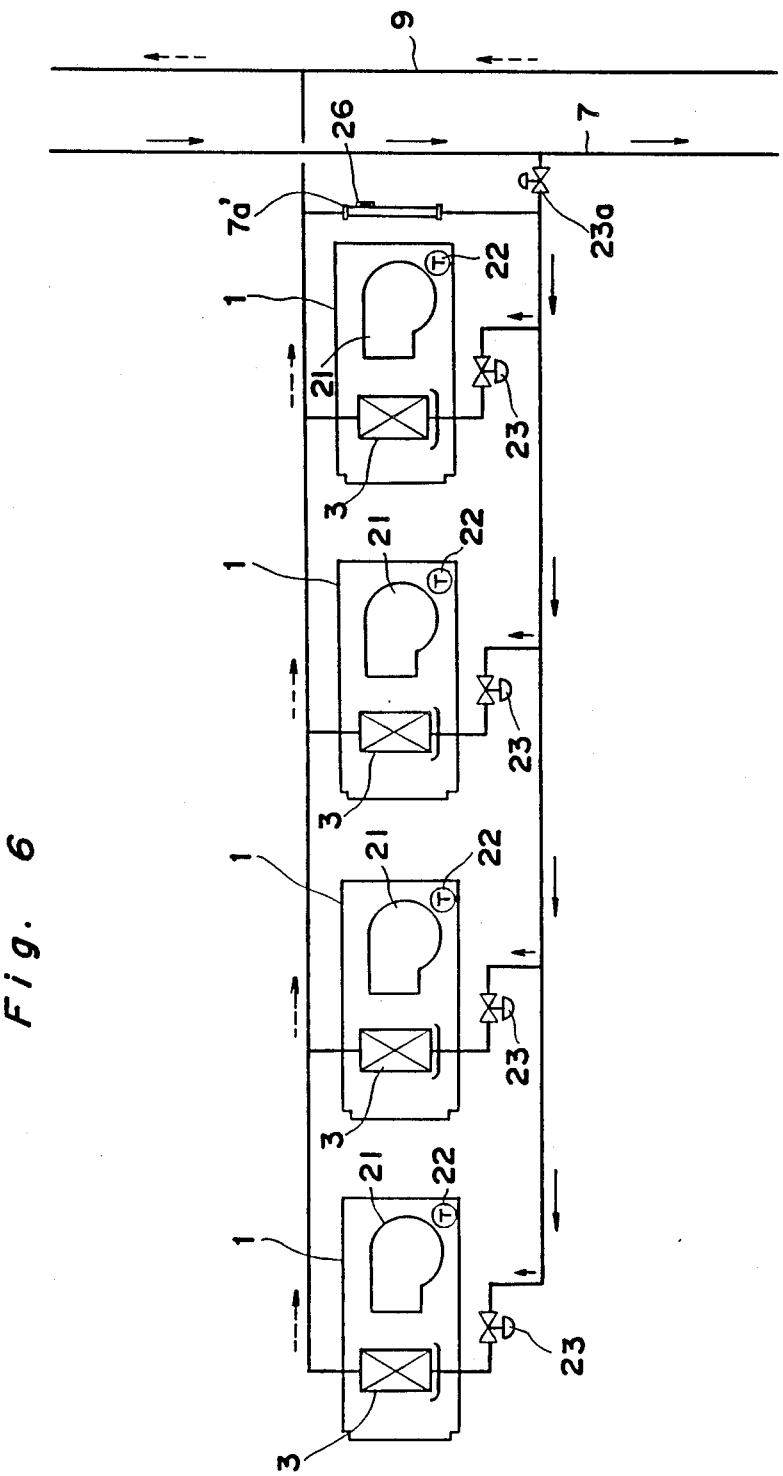
FIG. 6 is a schematic diagram of a second embodiment of the present invention.

In the embodiment as shown in FIG. 1, each air conditioner 1 is provided with a liquid level detection means. Alternatively, as shown in FIG. 6, wherein the first condenser 2 is omitted, a group of air conditioners on the same floor of a building can be controlled by a single liquid level detection means if all of the air conditioners can be operated in the same mode. In this embodiment, a common bypass 7a' is connected with both the heat pipes 7 and 9. An additional ON-OFF type flow control valve 23a for supplying the thermal medium in a liquid phase to each of the air conditioners is incorporated in a suitable portion of the heat pipe 7. The signals generated by the liquid level detection switch 26 and the respective thermistors 22 are issued to the controller, not shown in FIG. 6, by which the valves 23a and 23 are controlled. In this embodiment, the liquid level of the thermal medium in each of the respective vaporizers 3 is represented by the liquid level of the thermal medium in the bypass 7a'. Accordingly, the liquid level of the thermal medium in the respective vaporizers 3 is basically controlled by the signal from the switch 26.

In the embodiments described above, the liquid level detection switch 26 is employed to detect the liquid level of the thermal medium in the first vaporizer 3. Alternatively, it is possible to detect the liquid level of the thermal medium in the vaporizer 3 with a system that comprises a pair of temperature sensors (not shown) respectively incorporated in the inlet and outlet of the vaporizer 3. Specifically, if the thermal medium in a liquid phase does not reach the predetermined level, i.e. the outlet of the vaporizer 3, the temperature of the vapor, which passes through the outlet, is higher than that of the thermal medium in a liquid phase which is detected by the lower sensor mounted on the inlet of the vaporizer 3. On the other hand, when the thermal medium in a liquid phase reaches the predetermined level of the inlet in the vaporizer, the upper sensor detects the temperature of the thermal medium in a liquid phase which is the same as that of thermal medium detected by the lower sensor. Accordingly, by comparing both temperatures detected by the upper and lower sensors, liquid level detection can be carried out.

With the system described above, since the opening of the valves 23 and 24 are, respectively, controlled based on the differences between the actual temperature of the returning air and a predetermined temperature SP, that is, since the flow of the thermal medium is controlled in such a manner that the resistance to the flow of the thermal medium varies depending on the degree of opening of the valves 23 and 24 instead of depending on the amount of heat exchange, i.e. amount of vapor, the necessary amount of thermal medium can be supplied to the air conditioners. Furthermore, even if a plurality of air conditioners are respectively installed at different levels, i.e. on different floors of a building, since the liquid level of thermal medium in the first vaporizer 3 is controlled by the liquid level detection means and the flow control valve 23 so as to be maintained constant, the water head of the thermal medium in the respective air conditioners is maintained constant. Therefore, in the respective air conditioners on the different floors of the building, the thermal medium in a liquid phase in the corresponding vaporizers can be vaporized at substantially the same temperature under substantially the same pressure, resulting in the same cooling performance.

In addition, with the above system, it is possible to effect a dehumidifying operation in such a manner that supercooling dehumidification is carried out by the first vaporizer 3 and reheating is carried out by the first condenser 2. In this case, both the valves 23 and 24 are opened.

Alternatively, in FIG. 1, when the water head of the thermal medium at a lower one of the air conditioners is extremely high, it is preferable to incorporate a pressure reducing valve in each branch of the heat pipe upstream of the valve 23.

Figure 7:
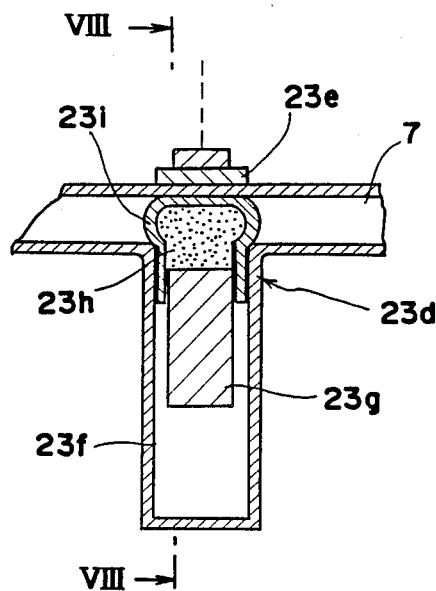
FIG. 7 is a section view of an embodiment of the flow control valve employed in the air control system shown in FIG. 1.
Figure 8:
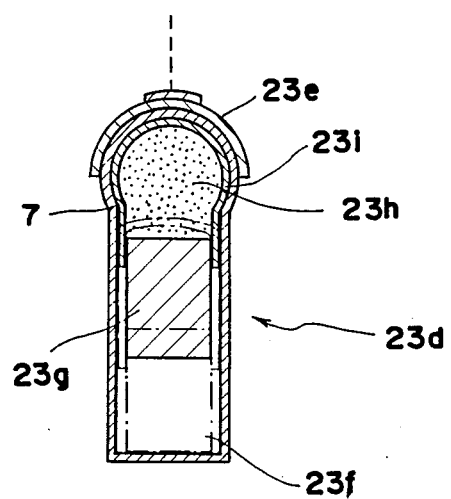
FIG. 8 is a section view taken along line VIII—VIII in FIG. 7.

FIGS. 7 and 8 show an example of the flow control valves 23 which are preferably employed in the air conditioning system. This electromagnetic valve 22d is incorporated in the heat pipe 7 through which the thermal medium in a liquid phase passes. The valve 23d has a housing 23f which extends downwardly from the horizontal heat pipe 7. A valve 23d is accommodated in the housing 23f so as to be movable upwardly and downwardly. The valve comprises a piston member or support member 23g and a flexible bag 23i which is secured on the top of the support member 23g and in which magnetic liquid 23h is disposed. A semicircular electromagnet 23e is secured on an upper portion of the outer periphery of the heat pipe 7 at a position above the valve 23d.

When the electromagnet 23e is excited, the magnetic liquid 23h is attracted to the excited electromagnet 23e so that the entire valve 23d moves upwardly in the housing 23f to close the heat pipe 7. The bag 23i, which is flexible, is brought into tight contact with the inner peripheral surface, i.e. the sealing surface, of the heat pipe 7 so that the heat pipe 7 is sealed tight. As shown in FIGS. 7 and 8, since the support member 23g remains in the housing 23f when the valve 23d closes the heat pipe 7, the entire valve 23d is prevented from being moved away from the predetermined position by the pressure exerted thereon by the thermal medium. Even if some foreign matter, such as dust, is sandwich between the bag 23i of the valve 23d and the sealing surface of the heat pipe 7, the bag 32i can be easily deformed over the foreign matter so that tight sealing can be effected. When the excitation of the electromagnet 23e is ceased, the valve 23d is released from the electromagnet 23e so that the valve 23d drops into the housing 23f by gravity, resulting in the opening of the heat pipe 7. When the entire valve 23d is accommodated in the housing 23f, the opened passage of the heat pipe can have the same diameter as that of the heat pipe 7 per se. Accordingly, it is advantageous that the pressure loss at the valve is smaller than that when a conventional electromagnetic valve is employed.

What is claimed is:

1. An air conditioning system for a building, said system comprising:
    a cold thermal source at which a relatively cold temperature is developed, said cold thermal source disposed at a relatively high location on the building;
    a hot thermal source at which a relatively high temperature is developed as compared to the temperature developed at said cold thermal source, said hot thermal source disposed at a relatively low location on the building as compared to the location at which said first thermal source is disposed;
    a plurality of air conditioners each of which air conditioners is disposed at a respective location between siad cold and said hot thermal sources in the building for air conditioning respective areas in the building,
    each of said air conditioners having a condenser in the form of a heat exchanger for facilitating a heat exchange with air in which the air is warmed, a vaporizer in the form of a heat exchanger for facilitating a heat exchange with air in which the air is cooled, and a fan for blowing air over said condenser and said vaporizer and into a respective one of said areas;
    cooling gravity type piping extending between and operatively connecting said cold thermal source and each said vaporizer of the air conditioners for allowing thermal medium to circulate therein between said cold thermal source and each said vaporizer;

heating gravity type piping extending between and operatively connecting said hot thermal source and each said condenser of the air conditioners for allowing thermal medium to circulate therein between said hot thermal source and each said condenser;

temperature sensors disposed at said areas for detecting the temperatures at said areas and for issuing signals corresponding to the detected temperatures;

flow control valves connected in said gravity type piping and respectively disposed at an inlet of each said vaporizer and an outlet of each said condenser for regulating the flow of thermal medium into each said vaporizer and out of each said condenser;

liquid level detection means operatively connected to each said vaporizer for detecting when thermal medium in a liquid phase has reached a predetermined level in each said vaporizer and for issuing a signal thereupon; and control means operatively connected to each of said temperature sensors, said liquid level detection means and said flow control valves for receiving the signals issued by said temperature sensors and said liquid level detection means and for controlling said flow control valves based on said signals to regulate the flow of thermal medium into each said condenser and out of each said vaporizer in a manner in which air in each of said areas is maintained at a predetermined temperature by said system as each said fan blows air over each said condenser and vaporizer, respectively.

2. An air conditioning system as claimed in claim 1, wherein each said fan is operable at various speeds, and said control means is operatively connected to each said fan for controlling the speed at which each said fan operates based on the signals issued by said temperature sensors.

3. An air conditioning system as claimed in claim 1, wherein said liquid level detection means comprises a respective bypass connected to said cooling gravity type piping in paralel with each said vaporizer, and a liquid level detecting switch connected to each said bypass for detecting when thermal medium in a liquid phase has reached a predetermined level in the bypass.

4. An air conditioning system as claimed in claim 3, wherein each said vaporizer includes heat exchange fins, and the liquid level detecting switch is mounted on said bypass at a location, with respect to the vaporizer in parallel with said bypass, at which the liquid level detecting switch detects when thermal medium in a liquid phase has risen substantially over an uppermost one of the heat exchange fins of the vaporizer.

5. An air conditioning system as claimed in claim 1, wherein portions of said heating gravity type piping extend horizontally, and each of said flow control valves comprises a housing open to and extending downwardly from a respective one of said portions of the heating gravity type piping, an electromagnet disposed over said heating gravity type piping above said housing, and a valve disposed in said housing and movable between a first position in said housing and a second position in said portion of the heat gravity type piping at which second position and valve obstructs the flow of thermal medium through said portion.

said valve including a support member, a flexible bag secured on said support member and disposed between said support member and said electromagnet, and magnetic liquid disposed in said flexible bag.

* * * * *

UNITED STATES PATENT AND TRADEMARK OFFICE
CERTIFICATE OF CORRECTION

PATENT NO. : 4,843,832

DATED : July 4, 1989

INVENTOR(S) : Tetsuo YAMADA et al.

It is certified that error appears in the above-identified patent and that said Letters Patent is hereby corrected as shown below:

On the first page of the patent document, below the names of the inventors, the following names of the assignees have been added:

--[73] Assignee: Takenaka Komuten Co., Ltd. and Sinko Kogyo Co., Ltd., both of Osaka, Japan--.

Signed and Sealed this

Third Day of July, 1990

*Attest:*

HARRY F. MANBECK, JR.

*Attesting Officer*  *Commissioner of Patents and Trademarks*